G. W. ATKINSON.
PNEUMATIC WHEEL.
APPLICATION FILED FEB. 1, 1913.
1,141,918.
Patented June 8, 1915.
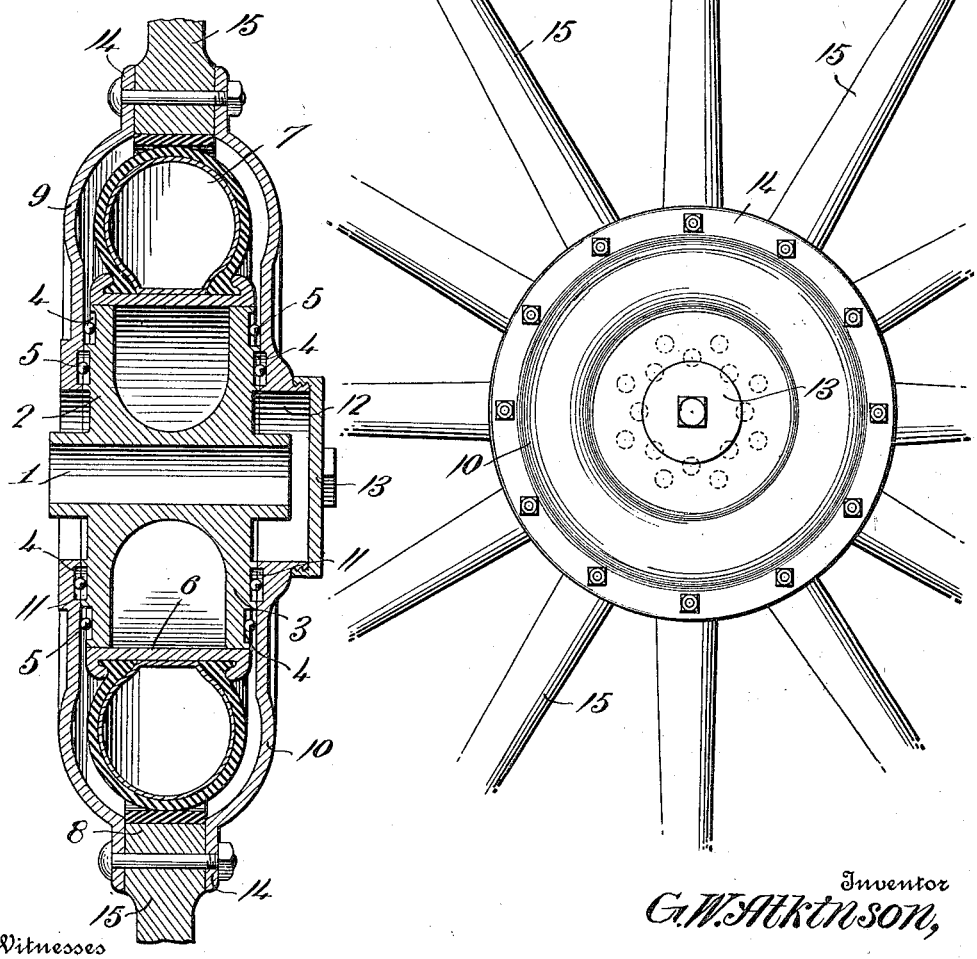

UNITED STATES PATENT OFFICE.

GEORGE WM. ATKINSON, OF DENVER, COLORADO.

PNEUMATIC WHEEL.

1,141,918.  Specification of Letters Patent.  Patented June 8, 1915.

Application filed February 1, 1913. Serial No. 745,650.

*To all whom it may concern:*

Be it known that I, GEORGE W. ATKINSON, a citizen of the United States, residing at Denver, in the county of Denver and State of Colorado, have invented new and useful Improvements in Pneumatic Wheels, of which the following is a specification.

This invention relates to pneumatic wheels and the object of the invention is to provide a wheel with the pneumatic tube inclosed within the hub, whereby the same will not be subjected to wear or punctures, and whereby the rim or felly of the wheel may be resiliently connected to the hub.

Further objects of this invention will appear as the following specific description is read in connection with the accompanying drawing, which forms a part of this application, and in which:—

Figure 1 is a side elevation. Fig. 2 is a vertical sectional view through the wheel.

Referring more particularly to the drawing, 1 represents the hub which is provided with a pair of spaced annular flanges 2 and 3, each of which is provided with circular ball receiving recesses 4 having a depth approximately half the diameter of the balls 5 which are inserted therein. Mounted upon the hub is an ordinary tire ring 6 to which is removably connected in the customary manner for clencher tires, a pneumatic tube 7 adapted to bear against the spoke supporting ring 8. Secured to this ring and extending upon opposite sides of the tire are annular disks 9 and 10, each being provided with circular ball receiving recesses 11 arranged to correspond or register with the ball receiving recesses 4 in the flanges 2 and 3. The recesses 4 and 11 are preferably arranged in separate circular series, as shown in Fig. 1 and are of sufficient diameter to give the spoke supporting ring sufficient movement toward and away from the hub to accommodate all ordinary shocks imparted to the wheel. The disk 10 is provided with an annularly threaded collar 12 upon which a closing cap 13 is threaded. Abutting the ring 8 and secured between the annular flanges 14 on the disks 9 and 10 are a plurality of radiating spokes 15 which are connected at their outer ends to a tire felly 16 upon which may be mounted any suitable type of tire.

What is claimed is:—

In a wheel, in combination, a cylindrical bearing, said bearing having an axle receiving opening, said bearing being formed at each side with a cylindrical raceway, an inflated tube secured around said bearing, a cylindrical flange formed upon each side of said cylindrical bearing in a plane with said races, a cylindrical flange formed upon each side of said bearing concentrically with said first mentioned flange, two disks, an annular collar formed upon one of said disks, an inner flange formed upon said collar of an equal diameter with one of said last mentioned flanges, an inturned flange formed upon the other disk equal in diameter to the other of said last mentioned flanges, said disk arranged to bear against said first mentioned flanges and having their flanges arranged to abut the similar side flanges of said bearing, each of said disks being dish-shaped, antifriction balls disposed in said annular recesses and in the spaces formed by said abutting flanges, a flange formed upon each of said disks and disposed in parallel relation, whereby to provide a space between the disk and said inflated tire, and a circumferentially extending series of spokes secured between said disk flanges, and a resilient rim interposed between said spokes and said inflatable tire.

In testimony whereof I affix my signature in presence of two witnesses.

GEORGE WM. ATKINSON.

Witnesses:
EDGAR A. WEST,
FRANK M. OESTERLL.

Copies of this patent may be obtained for five cents each, by addressing the "Commissioner of Patents, Washington, D. C."